(12) United States Patent
Garrett et al.

(10) Patent No.: US 7,640,761 B2
(45) Date of Patent: Jan. 5, 2010

(54) SYSTEM AND METHOD FOR CONTROLLING INDOOR AIR FLOW FOR HEATING, VENTILATING AND AIR CONDITIONING EQUIPMENT

(75) Inventors: Carl L. Garrett, Bullard, TX (US); Timothy W. Storm, Tyler, TX (US); Robert W. Helt, Tyler, TX (US); Gordon Jeffrey Hugghins, Jacksonville, TX (US)

(73) Assignee: Trane International Inc., Piscataway, NJ (US)

( * ) Notice: Subject to any disclaimer, the term of this patent is extended or adjusted under 35 U.S.C. 154(b) by 770 days.

(21) Appl. No.: 11/265,049

(22) Filed: Nov. 2, 2005

(65) Prior Publication Data
US 2007/0095082 A1  May 3, 2007

(51) Int. Cl.
F25D 17/04 (2006.01)
G05D 23/32 (2006.01)
G05D 7/00 (2006.01)
H02P 1/00 (2006.01)

(52) U.S. Cl. .............. 62/186; 62/158; 700/282; 318/268

(58) Field of Classification Search .......... 62/186, 62/180, 158; 236/49.3, DIG. 9, 15 BD; 700/276, 700/282, 299, 300; 318/268, 452
See application file for complete search history.

(56) References Cited

U.S. PATENT DOCUMENTS

| | | | |
|---|---|---|---|
| 5,303,561 A * | 4/1994 | Bahel et al. ................ 62/186 |
| 5,364,026 A | 11/1994 | Kundert | |
| 5,492,273 A * | 2/1996 | Shah ...................... 236/44 A |
| 5,926,386 A | 7/1999 | Ott et al. | |
| 6,155,341 A | 12/2000 | Thompson et al. | |
| 6,282,910 B1 | 9/2001 | Helt | |

\* cited by examiner

*Primary Examiner*—Chen-Wen Jiang
(74) *Attorney, Agent, or Firm*—Conley Rose, P.C.; Shannon W. Bates

(57) ABSTRACT

An HVAC system includes a variable speed electric motor driven fan for circulating air to an enclosed space through an indoor unit for providing heating or cooling effect to air circulated through the indoor unit. A controller with user or system installer actuatable switches includes a programmable microcontroller providing a pulse width modulated (PWM) signal to a motor control unit to select a predetermined air flowrate less than full air flowrate during system startup and shutdown. User input parameters include selected percentages of full air flowrate to satisfy requirements for reduced noise level, lower humidity and for improved sensible heating of air being circulated, the latter being effective particularly for heat pump applications. Selection of pre-run, short run and shutdown cycles may be provided.

31 Claims, 6 Drawing Sheets

| OPERATION | % PWM | % CFM |
|---|---|---|
| SINGLE STAGE COMPRESSOR | | |
| BK Start Delay (Blower turn-on delay) | 25% | 50% |
| Cooling/Compressor Only | 99% | 100% |
| Cooling/Droop | 70% | 80% |
| Heating/Compressor Only | 99% | 100% |
| Heating/Warm Air | 65% | 77% |
| Heating/Defrost | 99% | >=100% |
| TWO STAGE COMPRESSOR | | |
| BK Start Delay | 3% | 35% |
| Cooling/Lo Stage | 3% - 62.5% | 35% - 75% |
| Cooling/Hi Stage | 99% | 100% |
| Cooling/Droop (Lo stage only) | | 80% of selected airflow |
| Heating/Lo Stage | 3% - 62.5% | 35% - 75% |
| Heating/Hi Stage | 99% | 100% |
| Heating/Warm Air/Lo Stage | | 77% of |
| Heating/Warm Air/Hi Stage | 65% | 77% |
| Heating/Defrost/Any Stage | 99% | >=100% |
| Gas or Oil Furnace operating by itself | Standby Signal | W1 Tap |
| HP running in heating and one or more stages of electric auxiliary heat is on | 99% | >=100% |
| Wet Heat running in heating (H/C systems only) | 3% - 99% | 35% - 100% |
| Electric Heat running by itself | Standby Signal | W1 Tap |
| Fan Continuous Range | 3% - 99% | 35% - 100% |
| Fan Off Delay/Wet Heat | 3% | 35% |
| BK Standby Signal | 3% | — |

FIG. 9

SYSTEM AND METHOD FOR CONTROLLING INDOOR AIR FLOW FOR HEATING, VENTILATING AND AIR CONDITIONING EQUIPMENT

BACKGROUND OF THE INVENTION

In the art of heating, ventilating and air conditioning (HVAC) equipment there has been a continuing desire and need for a system and method for controlling indoor air flowrate due to varying circumstances and the types of equipment used in HVAC systems. For example, in many residential HVAC systems, the occupants of the house or dwelling being air conditioned may have a desire to vary the air flowrate, hence speed, of the indoor blower or fan which circulates the conditioned air throughout the dwelling. In situations where the humidity being sensed by the dwelling occupants needs to be reduced by varying amounts, such can be accomplished by changing the air flowrate over the air cooling heat exchanger, such as a vapor compression system evaporator coil. In other circumstances, such as for systems which utilize heat pumps for both heating and cooling, the occupants of the dwelling may desire to reduce air flow in the heating mode in order to have a sense of warmer air being circulated during system operation.

Still further, the occupants of a dwelling or other facility being air conditioned by a forced air HVAC system, may desire to operate the indoor air circulation blower or fan continuously and at selected variable speeds to control air flowrate and noise level, for example. Of course, the occupants of a dwelling or building being air conditioned by a forced air HVAC system may also have the desire to control indoor blower or fan speed and air circulation rate during startup and shutdown phases of operation of the system so as to be able to capture residual heating or cooling effect after system shutoff and to minimize the loss of heated or cooled air due to heat transfer in the system ductwork during periods of system shutoff. Accordingly, it is to provide the capability of changing air flowrates in an HVAC system to satisfy several needs and desires, including those mentioned above, that the present invention has been developed.

SUMMARY OF THE INVENTION

The present invention provides an improved system and method of controlling air flow in a forced air HVAC system and wherein the user of the system may select an indoor air flowrate according to the user's wishes to modify the sensed humidity and temperature of the circulating air.

In accordance with one aspect of the present invention, an HVAC system controller is provided which is advantageously embodied in a so-called thermostat device which may be operated by the user or occupant of the dwelling, building or other space being served by the HVAC system, whereby the user may provide temperature setpoints in various modes of operation of the system and may also make selections of indoor air flowrate during selected phases of operation. For example, if humidity control is required, the system user or installer may enable the reduction of indoor air flowrate to improve reduction in relative humidity when the system is operating to cool the indoor air. Still further, the equipment installer for the space being air conditioned may select reduced air flow in certain phases of operation of an HVAC system to provide warmer or cooler air flow sensed by the user.

The present invention still further provides an improved controller for an HVAC system which may be incorporated in a wall mountable thermostat type control device which may be operated by the user to set temperatures in both heating and cooling mode, to set the mode itself and to control indoor air blower speeds under selected operating conditions.

In accordance with another aspect of the invention, an HVAC system is provided which includes an indoor unit which is characterized by a motor driven blower or fan and one or more heat exchangers for providing warmed or cooled air or both, wherein the blower drive motor is a variable speed type and the operating speed may be selected by a pulse width modulated (PWM) electrical signal from a thermostat or controller to select the blower speed and provide the desired air flow. The thermostat or controller includes a programmable microcontroller which is operably connected to the indoor unit of the HVAC system, including the blower motor, and to the outdoor unit by way of selected circuit connections.

Further in accordance with the invention, the programmable microcontroller may be programmed to operate in a default mode if the user has not selected blower air flowrates for startup and/or shutdown of the HVAC system. The programmable microcontroller may also be programmed to provide a pulse width modulated output signal to the blower motor to control air flowrates from a predetermined minimum air flowrate to a maximum air flowrate in different operating modes of the HVAC system. Air flowrate "profiles" may be set, such as a two step, time delay profile at startup of the heat exchangers of the indoor portion of the system and, preferably, a single time delay flowrate profile at turnoff or shutdown of the heat exchangers of the indoor portion of the system. Still further, air flowrate profiles may be selected for applications wherein multiple stages of heating or cooling are provided wherein multiple stage compressors systems are operating at a low or first stage and when operating on a second (or third) high stage when a humidity sensor indicates humidity above a setpoint, for a heating mode of a heat pump system and for cooling efficiency (mild outdoor temperatures), for example. Accordingly, a relatively wide range of blower operating speeds may be selected, depending on the configuration of the HVAC system.

Those skilled in the art will further appreciate the above-mentioned advantages and superior features of the invention together with other important aspects thereof upon reading the detailed description which follows in conjunction with the drawings.

BRIEF DESCRIPTION OF THE DRAWINGS

FIG. 9 is a table of air flowrates for given electrical control signals to a blower motor controller in accordance with the method and system of the invention.

DETAILED DESCRIPTION OF THE PREFERRED EMBODIMENTS

Figure 1:
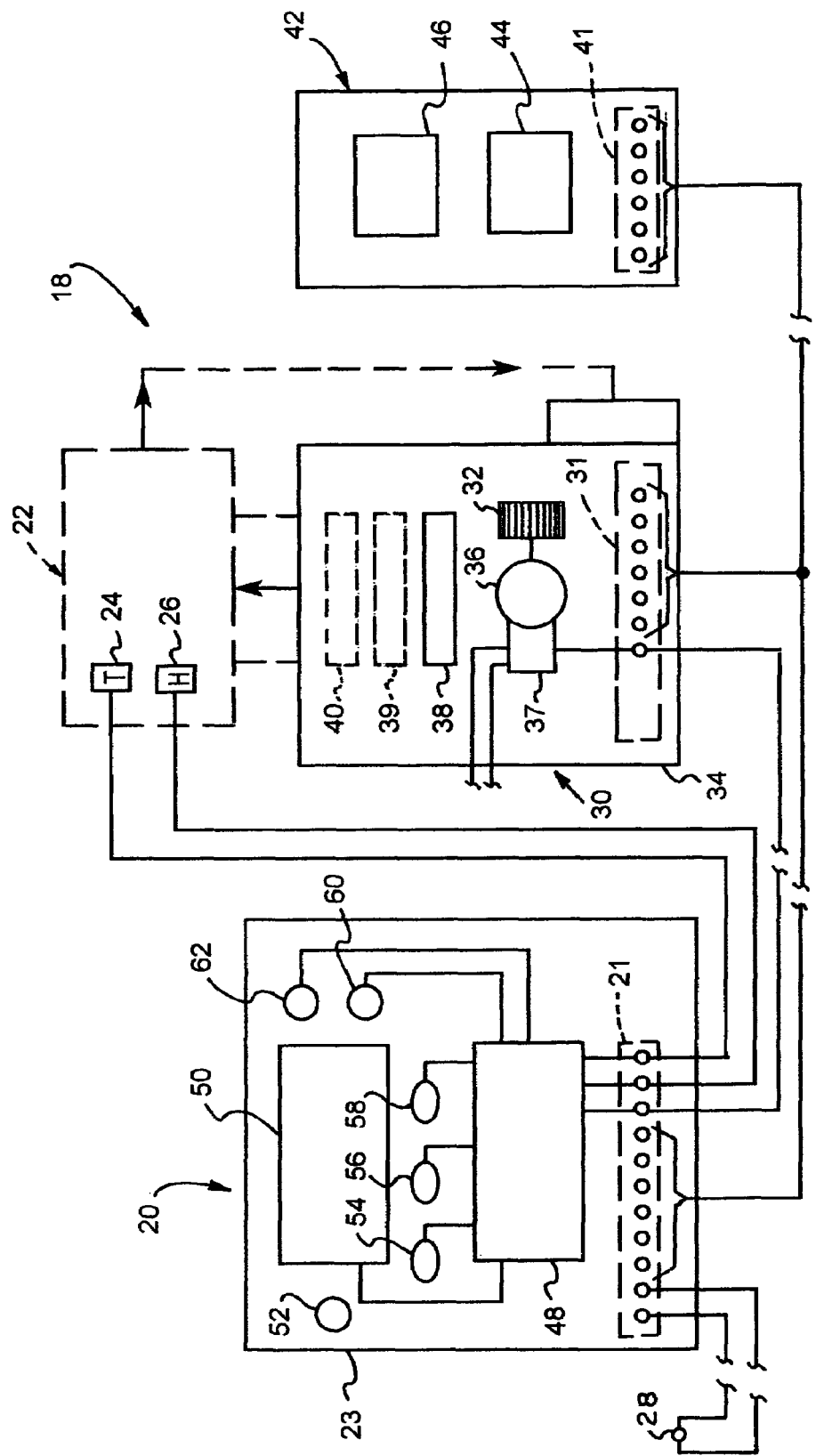
FIG. 1 is a general schematic diagram of an HVAC system including a controller for the system in accordance with the present invention.

In the description which follows like elements are marked throughout the specification and drawing with the same reference numerals, respectively. The drawing figures are not necessarily to scale and certain features may be shown exaggerated in scale or in schematic or generalized form in the interest of clarity and conciseness.

Referring to FIG. 1, the present invention includes a controller for a HVAC system 18 which may be characterized as a thermostat, generally designated by the numeral 20. The thermostat 20 not only includes certain temperature sensors, such as for sensing the temperature of an enclosed space 22 by way of a sensor 24, but may also include a humidity sensor 26 for sensing the relative humidity in the enclosed space 22. The thermostat controller 20 may also include a temperature sensor 28 for sensing the so-called outdoor temperature surrounding the enclosed space 22. The enclosed space 22 may be a private residential dwelling or one or more rooms or spaces in a commercial building, for example. The temperature and humidity within the enclosed space 22 is controlled by HVAC system 18 comprising an indoor unit 30 which may include a forced airflow fan or blower 32 disposed within a suitable cabinet 34 and operable to be driven by an electric motor 36 for circulating air to and from the enclosed space in a conventional manner. Motor 36 is operably connected to a source of electrical power by way of a motor controller or control unit 37. The indoor unit 30 of the HVAC system 18 may include one or more heat exchangers 38, 39 and 40 arranged in series or parallel with respect to air flow through the cabinet 34 and characterized as electric resistance type grids, or heat exchangers associated with a heat pump, a conventional vapor compression type air conditioning system, other chilled or heated fluids or a combination of such types of heat exchangers. In other words, the heat exchangers 38, 39 and/or 40 may provide for heating air being circulated through the cabinet 34, cooling air being circulated through the cabinet 34 and/or dehumidifying air flowing through cabinet 34.

The HVAC system 18, which the controller or thermostat 20 may be operable to control, also includes a so-called outdoor unit 42 which may include one or more vapor compression compressor units 44 and 46. The outdoor unit 42 may also include conventional condenser/evaporator type heat exchangers, not shown, operably connected to the heat exchangers 38, 39 and/or 40 making up a conventional single or multistage vapor compression air conditioning or heat pump system. The thermostat controller 20, the indoor unit 30 and the outdoor unit 42 are operably interconnected by way of respective electrical conductor terminal strips 21, 31 and 41 whereby control signals may be transmitted to and from the controller 20 for controlling operation of the motor 36 and associated control components normally found in an HVAC system.

Figure 2:
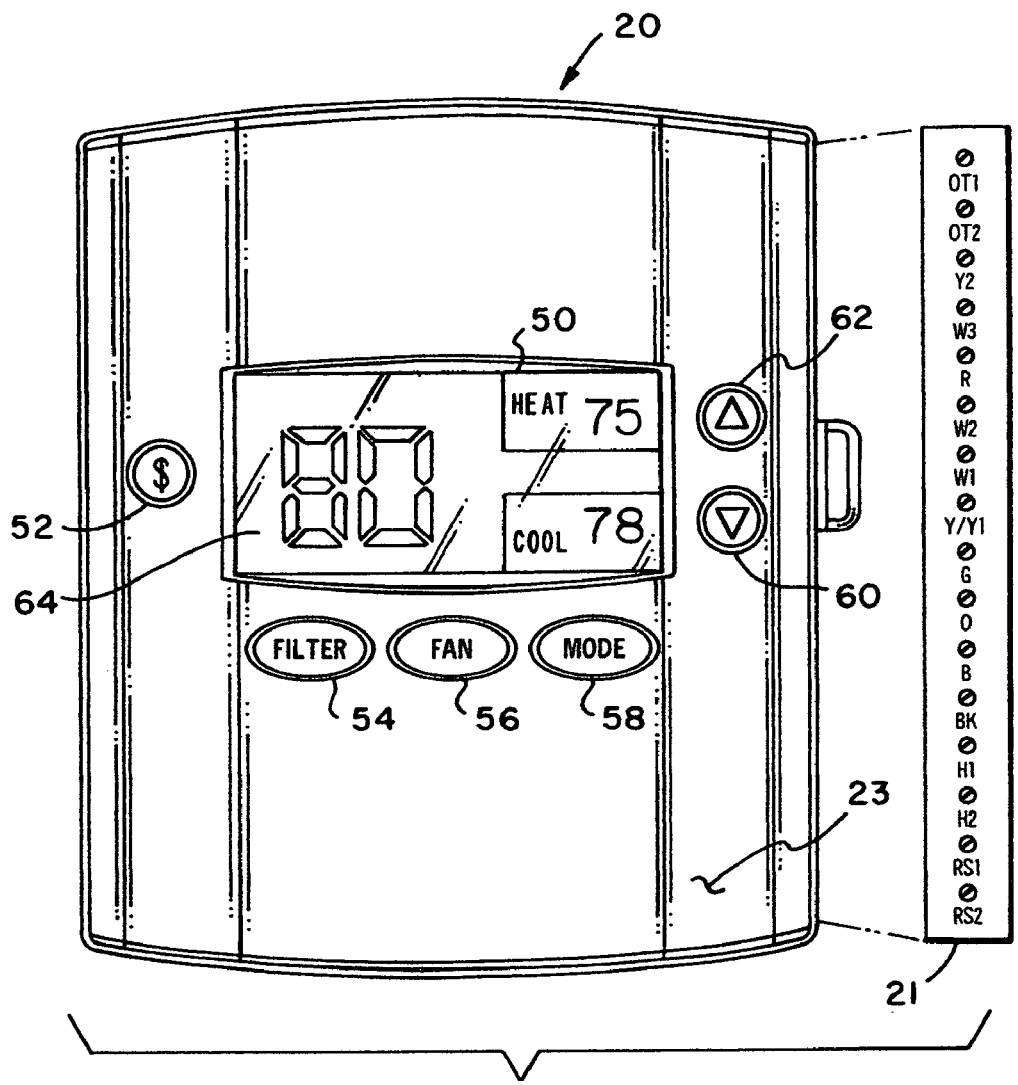
FIG. 2 is a front elevation of a thermostat type controller in accordance with the invention and showing a schematic representation of the control signal conductor terminals associated with the thermostat.

Referring further to FIG. 1 and also FIG. 2, the thermostat or controller 20 includes a suitable housing 23 in which is disposed a microcontroller 48 operably connected to a visual display 50 and to respective user controlled pushbutton type switch actuators 52, 54, 56, 58, 60 and 62. The visual display 50 is operable to display various indicia, such as indicated in FIG. 2, including the actual sensed temperature 64, as well as indicia, not shown, which would appear on the display as a number during installation and setup. Such numbers would correspond to a selected one of various sets of operating profiles, or portions of such profiles, including blower turn-on and turnoff times and a percent of maximum airflow. The pushbutton actuator 52 may be utilized to cause the microcontroller 48 to operate in a default mode or a temperature setback mode for energy savings. As indicated in FIG. 2, the pushbutton switch actuator 54 may be used to display the remaining prescribed life of the system air filter, the actuator 56 may be used to control operation of the fan or blower 32 and the actuator 58 may be used to control the mode of operation of the HVAC system 18, either a heating mode or a cooling mode, for example. The pushbutton switch actuators 60 and 62 may be utilized to decrease or increase, respectively, the numerical value of the parameter being set by the controller 20 and displayed on the display 50.

FIG. 2 illustrates the terminal strip 21 somewhat schematically, which strip may be mounted on the backside of the housing 23 of the controller 20 and include conventional wire connection terminals appropriately identified with alphanumeric designations according to HVAC system code standards, such as prescribed by the American National Standards Institute (ANSI). For example, the terminals OT1 and OT2 are terminals for the conductors for the temperature sensor 28. The terminal Y2 is for controlling a second stage compressor, such as the compressor 46. The terminal W3 is for sending a signal to a third stage heat exchanger or heating element, such as one of the heat exchangers 38, 39 or 40. The terminal R is for a connection to a low voltage power supply or transformer, not shown. Terminals W1 and W2 are for transmitting signals to the indoor unit 30 for controlling heat exchangers 38 and 39, respectively. Terminal Y/Y1 is for transmitting signals to the indoor unit 30 and outdoor unit 42 for controlling a first or only compressor stage, such as the compressor stage 44. Terminal G is for sending an on-off control signal to control unit 37 for blower motor 36. Terminal B is for a common conductor for the transformer signal and terminal BK is for transmitting a pulse width modulated (PWM) signal from the microcontroller 48 to control unit 37 for motor 36, see FIG. 1. Terminals H1 and H2 are for connecting the humidity sensor 26 to the controller 20 and terminals RS1 and RS2 are for connecting indoor temperature sensors, such as the temperature sensor 24 to the microcontroller 48.

In accordance with the invention, the user of the HVAC system 18 or, preferably, system installation personnel may control the operation of the motor 36 and fan or blower 32 to vary the air flow through the cabinet 34 in various predetermined sequences and for various periods of time for adjusting the humidity in the enclosed space 22 and for adjusting the sensed temperature of airflow into and through the enclosed space due to certain characteristics of the HVAC system as well as the heating and cooling effect provided by the heat exchangers or heating elements which are in use, including one or more of the heating elements or heat exchangers 38, 39 and 40. The motor 36 may be a brushless, permanent magnet, variable speed motor of a type commercially available, such as a Model ECM 2.3 motor available from the General Electric Company. Motor 36 includes the built-in control unit 37 which is adapted to receive a low voltage PWM signal from the microcontroller 48 for controlling the speed of motor and the fan or blower 32. However, other motors which will accept a PWM signal or its equivalent may be adapted to be controlled to provide the advantageous features of the present invention.

Figure 3:
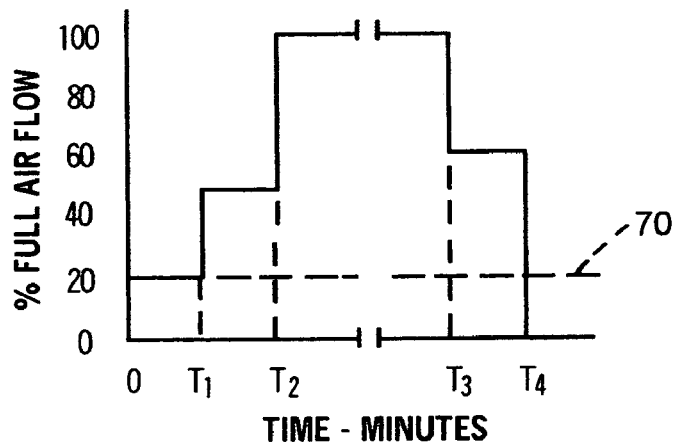
FIG. 3 is a diagram illustrating a typical example of an air flowrate profile selectable by a user of the system shown in FIGS. 1 and 2.

As previously discussed, the HVAC system 18 may be set or its operation modified by the controller 20 to provide a PWM signal to the control unit 37 for motor 36 during operation of the system to set a particular "profile" of circulation of indoor air at selected rates. The user may set operation of the blower 32, in the blower continuous mode, at a predetermined percentage of full air flowrate during periods when there is no call to system 18 for heating or cooling. The continuous air flowrate may be about twenty percent, for example, see FIG. 3, and as represented by the line 70. The diagram of FIG. 3 shows percent full air flow on the vertical scale and time in minutes, for example, on the horizontal scale. Zero time is that at which a call for heating or cooling is provided at the controller 20 due to correlation between the setpoint temperature for heating or cooling effect input by the user of thermostat controller 20 and the temperature sensed by the sensor 24 and/or sensor 28.

The HVAC system 18 may, for example, be controlled by the microcontroller 48 to control the motor 36 to provide a predetermined percent of full air flow for a predetermined time period at the time of energization or startup of the system in heating or cooling mode to provide heating or cooling effect at the heat exchangers 38, and/or 39 and/or 40. The time periods for reduced airflow may, as previously discussed, be selected by the system installer, or preset by microcontroller 48. A minimum thirty-five percent air flowrate, for example, could be provided from the call for heating or cooling effect out to time $T_1$ in FIG. 3. This period of time from 0 to $T_1$ in FIG. 3, may be known as the prerun delay period. The system 18 may also, for example, be set at an increased air flowrate known as short run over a time period between time $T_1$ and $T_2$ in FIG. 3 which is a flowrate (fifty percent of maximum is shown) to minimize the sensed temperature of the flowing air due to cooling or heating of the air in the system air flow delivery ducts, or stratification of the air in such ducting, or within the space 22, all often occurring during periods of system shutdown. Predetermined limits may be imposed on the time $T_2$ in accordance with the type of heating or cooling equipment being utilized and provided at the heat exchangers 38, 39 or 40 to minimize an over temperature condition or to minimize the chance of condensate freezing on the heat exchangers, for example. Accordingly, time $T_2$ may be a predetermined maximum beyond which the microcontroller 48 will automatically transmit a signal to the motor controller 37 to require substantial or full motor speed and air flow, indicated as one hundred percent, by way of example, in the diagram of FIG. 3. Accordingly, the full or one hundred percent air flowrate, shown in FIG. 3 between times $T_2$ and $T_3$, is also known as the normal air flowrate.

The system 18 may also be set to a predetermined air flowrate by selecting a reduced speed for the blower 32, after the call for heating or cooling is satisfied at time $T_3$, by providing for a so-called blower run-on or turnoff cycle at a reduced air flowrate of from fifty percent to sixty-five percent of maximum, for example, as shown in FIG. 3. Air will be circulated at this percentage of full air flowrate for a period of time between time $T_3$ and $T_4$. At time $T_4$, motor 36 is deenergized or may be operated continuously at, for example, twenty percent of full air flowrate, if that mode of operation has been selected by the system user.

Accordingly, the system 18 may be operated at various blower turn-on and turnoff time delay profiles, in minutes, at a specific percent of air flow as compared with full or one hundred percent air flow. When the controller 20 is sensing temperature from the sensors 24 and 28 and humidity from the sensor 26 and operating according to the setpoints for heating and cooling, certain air flowrates, generally in accordance with the diagram of FIG. 3, may be selected within preset conditions or limitations programmed into the microcontroller 48, for example. When microcontroller 48 determines a call for heating or cooling effect to be provided by the system 18, the microcontroller 48 will impose a signal at terminals G and BK in accordance with a preprogrammed percent of air flow.

For example, with a zero percent PWM signal provided at terminal BK, the air flowrate may be preset at thirty-three percent and when a one hundred percent PWM signal is imposed by the microcontroller 48 on controller terminal BK, the motor 36 will be commanded by control unit 37 to provide one hundred percent air flow. Zero percent PWM signal means no current flowing at terminal BK, fifty percent PWM signal means current flowing for half of a designated time period (i.e., a square wave signal) and one hundred percent PWM signal is current flowing constantly.

Still further, air flowrate profiles may be selected for predetermined periods of time in minutes, for example, at a particular percent of full or maximum air flow. A factory default setting for the pre-run delay period and short run delay period of zero minutes at zero percent air flowrate is typically selected. In other words, in the factory default setting, when a call for heating or cooling is received at thermostat 20, motor 36 is commanded to immediately accelerate to full or one hundred percent air flow. Other preprogrammed flowrates in the pre-run delay and short run delay may be, for example, one minute at fifty percent air flowrate and seven and a half minutes at eighty percent air flowrate. Other selected pre-run and short run delay periods may be, for example, one minute at fifty percent air flowrate and four minutes at eighty percent air flowrate. Further pre-run and short run flowrates may be selected as zero minutes at zero percent air flowrate and seven and a half minutes at eighty percent flowrate, zero minutes at zero percent flowrate and four minutes at eighty percent flowrate, one minute at fifty percent flowrate and zero minutes at zero percent air flowrate.

Blower run on or so-called turnoff delay profiles may be selected (these are times $T_3$ to $T_4$ in FIG. 3) of one and one half minutes at one hundred percent air flowrate as a factory default setting or zero minutes at zero percent flowrate. Still further, preset rates of one-half minute at fifty percent air flowrate, one and one half minutes at fifty percent air flowrate, three minutes at fifty percent air flowrate, or one half minute at thirty-five percent air flowrate. These settings may all be preprogrammed into the microcontroller 48 and given a numerical code for use in setting the operating cycle or profile.

Alternatively, the microcontroller 48 may be programmed to allow the system installer (or the user) to set the percent air flowrate and the time period for each percent air flowrate as long as certain minimums and/or maximums are not exceeded. For example, the system installer or user may be allowed to adjust the air flowrate in five percent increments. However, the percent air flowrate for preset turn on (pre-run and/or short run) and turnoff profiles is typically for a single stage system or for the second stage operation of a two stage system. These percentages of air flow may be required to be adjusted for first stage operation in a two stage system and any user selected percent air flow would be that percent air flow multiplied by an installer selected first stage percent air flowrate.

If a continuous fan mode has been selected, that is the fan runs constantly at a selected percent of full air flow when there is no call for heating or cooling, then typically, if the system cycles off the signal imposed at terminals BK go immediately to the continuous fan air flow setting. However, during the "turn-on" profiles while the system is operated, a continuous fan air flow mode signal imposed on terminals BK should be one corresponding to the profile selected but at a motor speed not less than the continuous fan mode speed.

Another preferred mode of operation is, if continuous fan mode is not selected and a blower or fan turnoff delay profile is selected and the system compressor shuts off during a pre-run delay time, the system should go to the blower turnoff delay flowrate which is a certain percent of the turn-on or pre-run air flow percent, for example, fifty percent of fifty percent air flow or twenty-five percent air flow. Under the same conditions, if the compressor cycles off during the short run delay profile the microcontroller 48 should impose a signal on terminals BK to cause the blower or fan 32 to operate at the blower turnoff air flowrate times the short run air flowrate, for example, fifty percent of eighty percent air flow or forty percent air flow. However, if the air flow percentage calculated drops to a minimum, say thirty-five percent, the controller would cause the blower to operate at the minimum continuous air flow percentage.

Figure 4:
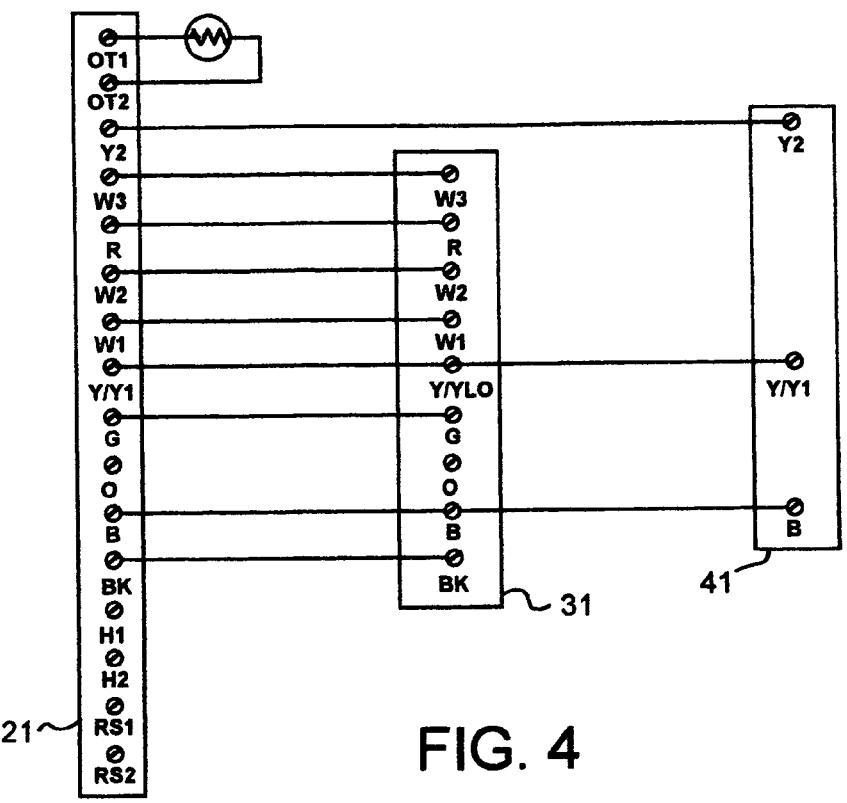
FIGS. 4 through 8 are diagrams indicating electrical connections made between the thermostat controller, an indoor unit of an HVAC system and an outdoor unit of the HVAC system.
Figure 5:
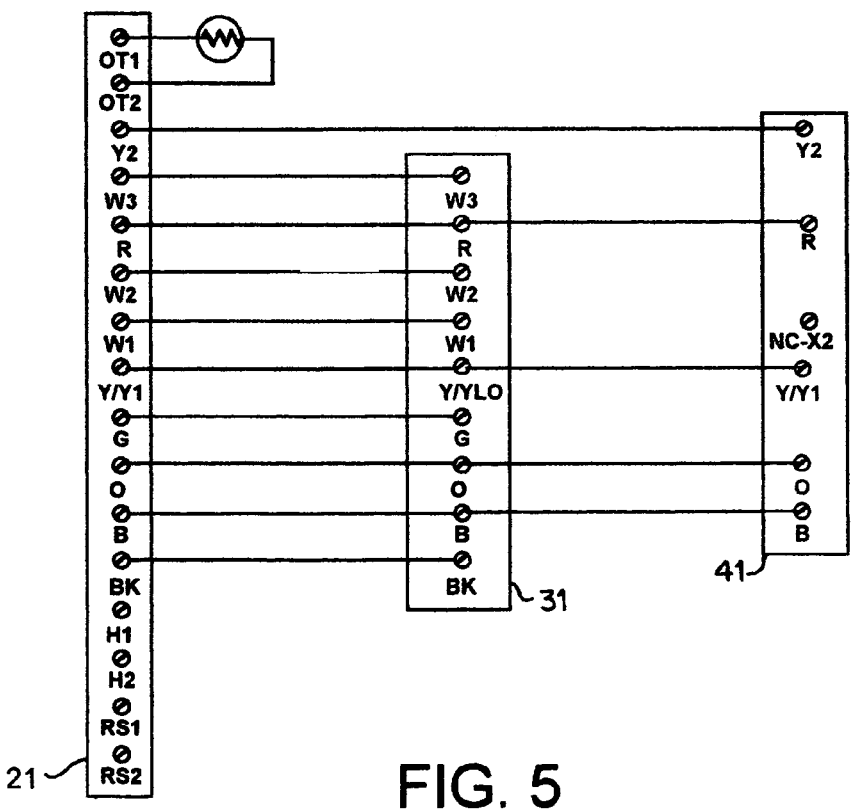

FIGS. 4 through 8 show typical wiring connections between the respective terminal strips 21 and 31 of the controller 20 and the indoor unit 30 and between terminal strip 31 and a terminal strip 41 of an outdoor unit 42 for various systems which may be controlled in accordance with the invention and which may utilize the method of the invention. In the diagrams of FIGS. 4 through 8, only the connections being used may be shown on terminal strips 31, 41 and 41a. FIG. 4 illustrates connections between the terminal strips of the controller 20, the indoor unit 30 and the outdoor unit 42 for three stages of heating and two stages of compressor operation. FIG. 5 illustrates the connections between the respective terminal strips for the controller 20, the indoor unit 30 and the outdoor unit 42 for three stages of indoor heaters and two stages of compressor heat pump operation. Typically, this system would provide for two stages of heat pump operation and a third stage of electric heating, for example.

Figure 6:
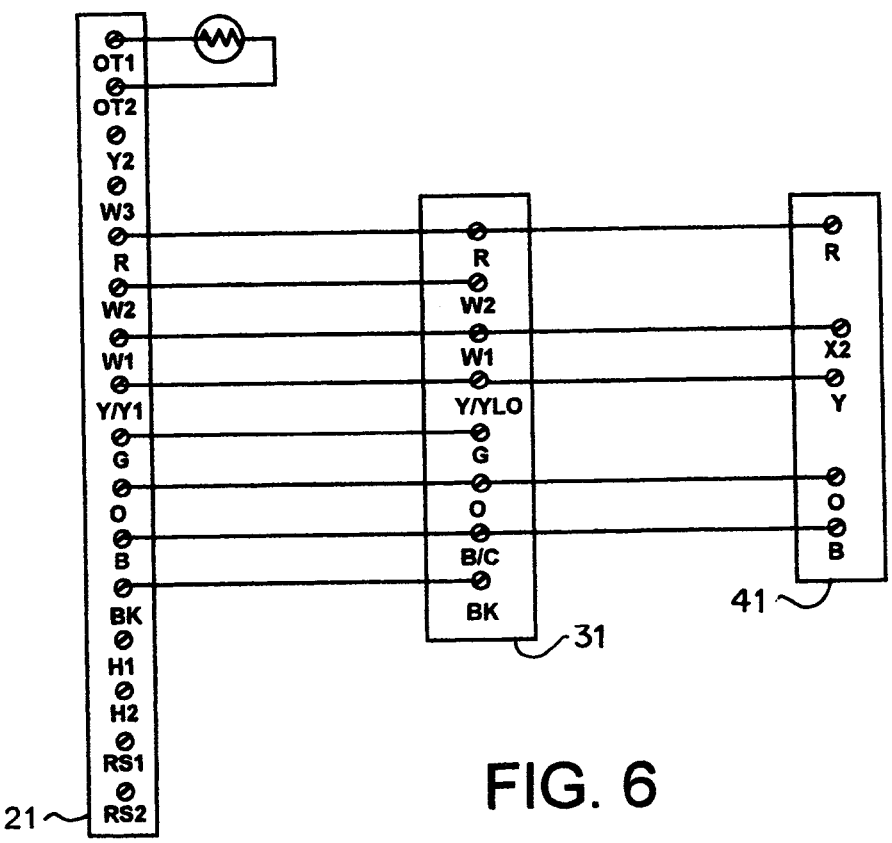

FIG. 6 illustrates the connections between the terminal strips for the respective components 20, 30 and 42 for a single stage compressor in a heat pump system with a dual fuel furnace.

Figure 7:
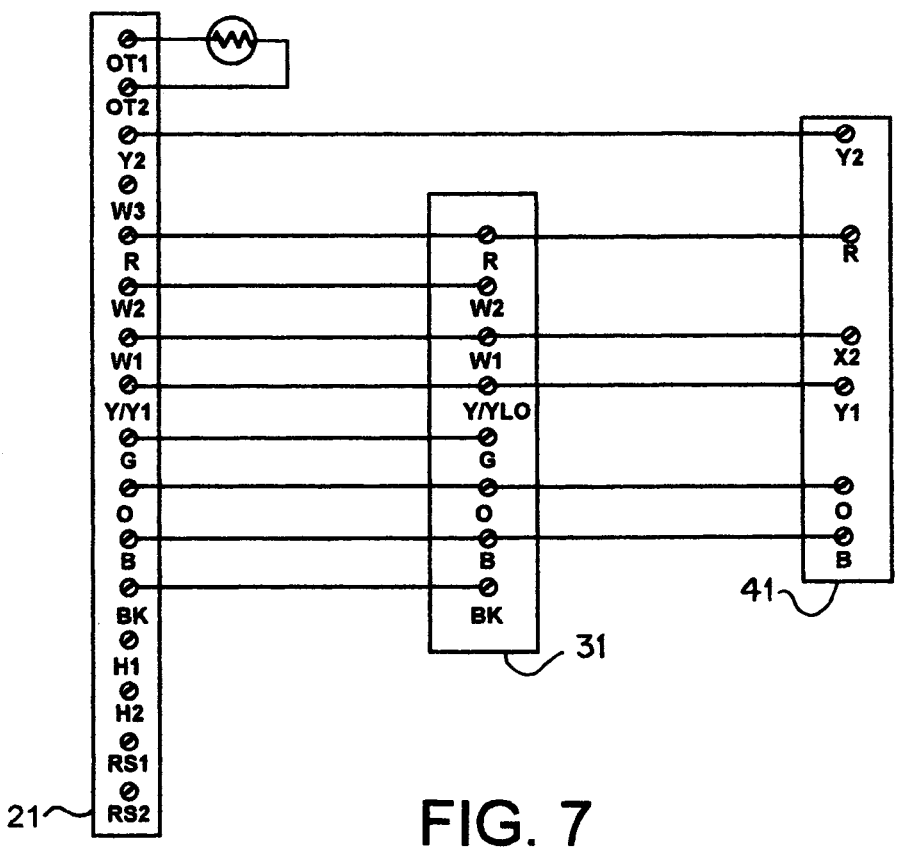

FIG. 7 illustrates the connections between the respective terminal strips for the controller 20, the indoor unit 30 and the outdoor unit 42 for a two stage heat pump system with a dual fuel two stage furnace.

Figure 8:
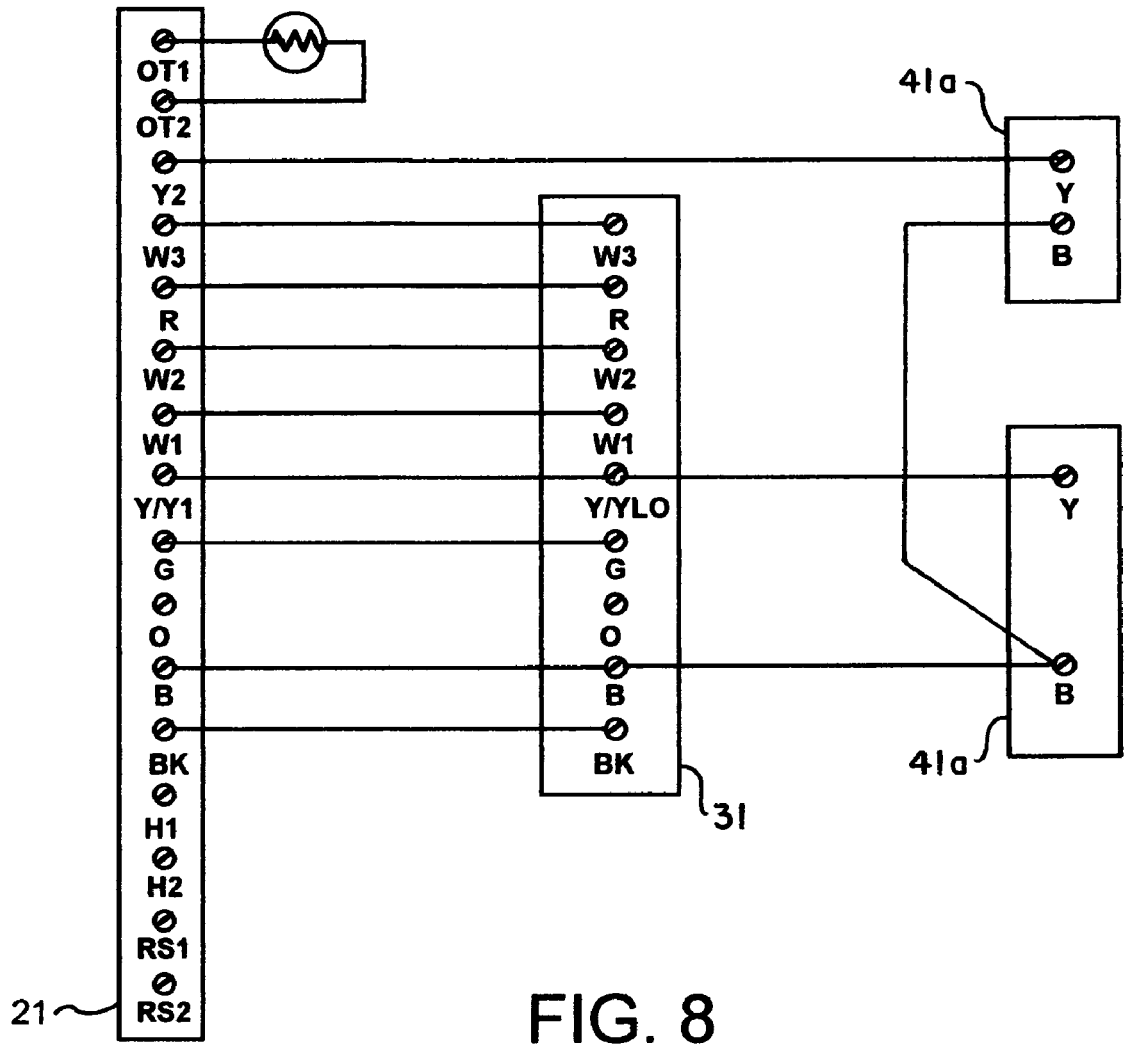

FIG. 8 illustrates the connections between the terminal strips 21, 31 and 41a for the components 20, 30 and 42 for one, two or three stages of heat, which can be electric heat, and with two separate single stage air conditioning compressor units operating as the outdoor unit. In FIG. 8, separate terminal strips 41a are shown for respective compressors of the outdoor unit 42.

Additional control scenarios are operable to be programmed into the microcontroller 48 depending on the particular system being controlled. For systems utilizing two or three stages of compression, the air flowrate for low stage compressor operation in a two stage system, for example, could be installer selectable from thirty-five percent to seventy-five percent of air flow in increments of five percent with a so-called factory default setting of fifty percent. Moreover, a percentage of total air flowrate for the turn on or startup as well as the turnoff or shutdown profiles may be selected for first stage operation wherein the percent air flow actually programmed and carried out is equal to a user selected profile percent air flow multiplied by the installer selected low stage percent air flow. Reduced air flowrates during the high or highest compressor stage operation would not normally be permitted, except when a humidity sensor would sense relative humidity greater than the setpoint, for heat pump heating modes and for cooling "efficiency" operation during periods of mild outdoor temperatures.

Still further, for example, when continuous operation of blower or fan 32 is selected and the system has been operating a compressor and/or electric heat and is cycled off, i.e., setpoint has been achieved, the PWM signal from terminal BK output to the control unit 37 may go to a continuous fan air flowrate setting. However, if the continuous air flowrate is less than the regular system full running air flowrate, the air flowrate is reduced to the running air flowrate at the start of the profile and delay times are monitored since the number of stages in operation may vary in accordance with the call for heating or cooling.

Alternatively, for example, as mentioned previously, if the continuous air flowrate programmed by the controller 48 is less than a selected air flowrate, the greater of the two will prevail. Still further, if a continuous fan operating mode is not selected, but a turnoff delay is selected, and a compressor cycles off during the pre-run delay, system operation should go to the blower turnoff delay percent of the pre-run air flowrate (namely, 50% of 50% or 25% of full air flowrate). Under the same conditions, if the compressor cycles off during a short run delay, the controller 48 should adjust the motor operating speed to provide the blower turnoff delay percent of the short run air flow percent (for example, 50% of 80% airflow or 40% of full air flowrate). If an air flowrate percentage less than a predetermined minimum is calculated by the controller 48, the control signal provided to the motor control unit 37 should call for the minimum air flowrate percentage, such as thirty-five percent of full airflow.

Still further in accordance with the invention, in operating modes wherein the heat exchangers 38 and 39 are heat pump type heat exchangers and the system is operating in the heating mode for heating the space 22, the air flow should be limited to not less than thirty-five percent of full air flow while operating on a single stage of operation. If one or more auxiliary heating stages are being called in addition to the heat pump stage, no adjustment to air flow need be made.

FIG. 9 is a table showing preferable air flowrates as a percent of total capacity of the motor driven fan 36 and the percent PWM signal required to obtain that setting for different operating conditions in accordance with the invention. The microcontroller 48 is also operable to receive a signal from the humidity sensor 26 to reduce air flow so that the heat exchangers 38, 39 or 40 have a better opportunity to remove moisture from the air flowstream in a cooling mode of operation. In such a mode the compressor "on" cycle time may be extended by two minutes during each cycle and the selected blower turnoff delay may be defeated and replaced by a routine wherein the airflow is reduced by twenty percent of whatever setting is in effect when the room temperature is within two degrees of the cooling setpoint or below the setpoint.

The HVAC system 18 may be operated in a mode when a so-called wet heat type heating source is furnishing heat via the heat exchangers 38, 39 or 40. With so-called wet heat being applied via one or more of heat exchangers 38, 39 or 40, air flow is modulated based on load value and no duty cycling is provided at terminal W1.

Those skilled in the art will appreciate that a single or multistage HVAC system in accordance with the invention enjoys improved operation with respect to controlling forced airflow through an enclosed space being conditioned by the system. By allowing selection of the percent of maximum airflow throughput by the system, noise levels within the conditioned space may be reduced, sensed temperature of air circulating within the space may be modified to eliminate the adverse effects of temperature stratification of the air, and moisture removal may be selectively enhanced. The system may use less power than prior art systems and improved filtration of airflow may be obtained by controlling the air flowrate. Still further, improved comfort resulting from air circulated through the indoor heat exchanger(s) of a heat pump type system may be enjoyed. The system components described herein may be obtained using commercially available components and known manufacturing methods, and the microcontroller 48 may be programmed using conventional programming practices.

Although preferred embodiments of the invention have been described in detail herein, those skilled in the art will recognize that various substitutions and modifications may be made without departing from the scope and spirit of the appended claims.

What is claimed is:

1. A heating, ventilating and air conditioning system comprising:
    an indoor unit including a motor driven fan for circulating air to and from an enclosed space, said fan being driven by a variable speed electric motor, at least one heat exchanger disposed in a flow path of air circulating through said indoor unit; and
    a controller operably connected to said indoor unit including a programmable microcontroller operable to provide pulse width modulated signals to a motor control unit for said motor, said controller including one of installer and user selected values of motor speed for controlling airflow through said heat exchanger to provide at least one comfort parameter sensed by said user;
    wherein the controller is configured to cause operation of the motor to provide a flowrate of about twenty percent to about fifty percent of a maximum flowrate during a pre-run delay period, the controller is configured to cause operation of the motor to provide a flowrate of about fifty percent to about eighty percent of the maximum flowrate during a short run delay period that follows the pre-run delay period, the controller is configured to cause operation of the motor at substantially the maximum flowrate after the short run delay period, and the controller is configured to cause operation of the motor at about fifty percent to about sixty-five percent of the maximum flowrate during a run-on cycle after the motor is operated at substantially the maximum flowrate.

2. The system set forth in claim 1 wherein:
    said controller includes a temperature sensor for sensing the temperature in said enclosed space and said microcontroller is responsive to a call for one of heating or cooling air to be circulated through said space for providing a selected air flowrate less than full air flowrate at startup of said fan.

3. The system set forth in claim 2 wherein:
    said microcontroller is operable to control the speed of said motor when the call for heating or cooling is satisfied to provide a selected air flowrate through said indoor unit less than full air flowrate capability of said fan.

4. The system set forth in claim 3 wherein:
    said controller comprises a visual display operably connected to said microcontroller and user or installer actuatable switch actuators for selecting at least one of a percent air flowrate of full air flowrate and a time of reduced air flowrate during at least one of a pre-run period after a call for heating or cooling, a short run period following said pre-run period and a shutdown period after said call for heating or cooling is satisfied.

5. The system set forth in claim 1 wherein:
    said microcontroller is operable to provide a pulse width modulated signal to said motor control unit for selecting the air flowrate and the time of said air flowrate during an operating cycle of said indoor unit.

6. The system set forth in claim 1 wherein:
    at least one of said heat exchangers comprises one of an evaporator coil and a condenser coil of a vapor compression refrigerant condensing and expansion circuit for providing cooling and heating to said air circulating through said indoor unit.

7. The system set forth in claim 1 wherein:
    at least one of said heat exchangers comprises one of a dual fuel furnace and an electric furnace.

8. In a heating, ventilating and air conditioning system including an indoor unit comprising a variable speed electric motor driven fan for circulating air to and from an enclosed space, said indoor unit including at least one heat exchanger for providing one of a heating and cooling effect to said air circulating to said indoor space and a controller including user actuatable switch actuators and a microcontroller operable to provide a signal to a motor control unit for said electric motor to control motor speed and air circulating rate to said indoor space, the method characterized by:
    providing a selected pulse width modulated electrical signal to said motor control unit to provide predetermined motor speed corresponding to said pulse width modulated signal to modify the air flowrate to a predetermined percentage of full air flowrate available from said fan; operating the motor to provide a flowrate of about twenty percent to about fifty percent of a maximum flowrate during a pre-run delay period, operating the motor to provide a flowrate of about fifty percent to about eighty percent of the maximum flowrate during a short run delay period that follows the pre-run delay period, operating the motor at substantially the maximum flowrate after the short run delay period, and operating the motor at about fifty percent to about sixty-five percent of the maximum flowrate during a run-on cycle after the motor is operated at substantially the maximum flowrate.

9. The method set forth in claim 8 including the step of:
    providing said selected signal for selecting a predetermined air flowrate during a pre-run period after a call for one of heating and cooling effect from said system.

10. The method set forth in claim 9 including the step of:
    providing said selected signal for selecting a predetermined air flowrate during a short run period following said pre-run period.

11. The method set forth in claim 8 including the step of:
    providing said selected signal for selecting a predetermined air flowrate during a system shutdown phase commencing with satisfaction of a call for one of heating and cooling effect by said system.

12. The method set forth in claim 8 including the step of:
    providing said selected signal for controlling a continuous air flowrate available from said fan.

13. The method set forth in claim 8 including the step of:
    providing selected ranges of a pre-run delay time and a short run delay time of air flowrate less than full air flowrate from a selected number of preset flow rates and periods of such air flowrates for said pre-run delay time and short run delay time.

14. The method set forth in claim 13 wherein:
respective sets of pre-run delay times and short run delay times are provided for fan turn-on delay profiles and fan turnoff delay profiles, said profiles commencing with a call for one of heating and cooling and satisfaction of said call for one of heating and cooling, respectively.

15. The method set forth in claim 8 including the step of:
causing said microcontroller to provide a signal to said control unit for a predetermined air flowrate dependent on single stage operation or multistage operation of said system.

16. The method set forth in claim 15 wherein:
the percentage of full air flowrate is adjusted based on a selected air flowrate multiplied by an installer selected air flowrate for a single or low stage system operation.

17. The method set forth in claim 8 including the step of:
providing said signal to said motor control unit to modify said air flowrate to a predetermined value dependent on whether said heating effect is provided by a heat pump heat exchanger, a dual fuel furnace and an electric heat source.

18. The method set forth in claim 8 including the step of:
providing said signal to said motor control unit to provide a predetermined air flowrate if one of heating or cooling effect is terminated during one of a pre-run delay period or a short run delay period, said pre-run delay period commencing with a call for one of heating or cooling effect and said short run delay period commencing with termination of said pre-run delay period.

19. The method set forth in claim 18 wherein:
said signal to said motor control unit provides for an air flowrate which is a predetermined percentage of a pre-programmed air flowrate during said pre-run delay period or said short run delay period dependent on which period said one of said heating or cooling effect is terminated.

20. In a heating, ventilating and air conditioning system including an indoor unit comprising a variable speed electric motor driven fan for circulating air to and from an enclosed space, said indoor unit including at least one heat exchanger for providing one of a heating and cooling effect to said air circulating to said indoor space and a controller including switch actuators and a microcontroller operable to provide a signal to a motor control unit for said electric motor to control motor speed and air circulation rate to said indoor space, the method characterized by:
providing a selected electrical signal to said motor control unit to provide a predetermined motor speed corresponding to said selected signal to modify the air flowrate to a predetermined percentage of full air flowrate available from said fan during one of a pre-run period after a call for one of heating and cooling effect from said system, a short run period following said pre-run period, and a system shutdown phase commencing with satisfaction of a call for one of heating and cooling effect by said system;
wherein the motor is operated at substantially the full air flowrate during at least a commencement of a period between the short run period and the system shutdown phase.

21. The method set forth in claim 20 including the step of:
providing said signal to said motor control unit to modify said air flowrate to a predetermined value dependent on whether said heating effect is provided by a heat pump heat exchanger, a dual fuel furnace and an electric heat source.

22. The method set forth in claim 20 including the step of:
providing said signal to said motor control unit to provide a predetermined air flowrate if one of heating or cooling effect is terminated during one of said pre-run delay period, and said short run delay period, said pre-run delay period commencing with a call for one of heating or cooling effect and said short run delay period commencing with termination of said pre-run delay period.

23. The method set forth in claim 22 wherein:
said signal to said motor control unit provides for an air flowrate which is a predetermined percentage of a pre-programmed air flowrate during said pre-run delay period or said short run delay period dependent on which period said one of said heating or cooling effect is terminated.

24. The method set forth in claim 20 including the step of:
providing selected ranges of a pre-run delay time and a short run delay time of air flowrate less than full air flowrate from a selected number of preset flow rates and periods of such air flowrates for said pre-run delay time and short run delay time.

25. The method set forth in claim 24 wherein:
Respective sets of pre-run delay times and short run delay times are provided for fan turn-on delay profiles and fan turnoff delay profiles, said profiles commencing with a call for one of heating and cooling and satisfaction of said call for one of heating and cooling, respectively.

26. The method set forth in claim 20 including the step of:
causing said microcontroller to provide a signal to said control unit for providing a predetermined air flowrate dependent on single stage operation or multistage operation of said system.

27. The method set forth in claim 26 wherein:
said system comprises a multistage compressor for circulating a heat exchange fluid and said method includes the step of causing said microcontroller to provide a signal to said control unit to provide a reduced air flowrate when said system is operating at a first or low stage of compression.

28. The method set forth in claim 27 including the step of:
causing said controller to provide a signal to said control unit to provide maximum air flowrate through said system when said system is operating at a highest stage of compression unless said system is operating in conjunction with a humidity sensor or said system is a heat pump operating in the heat pump heating mode or said system is operating in the cooling mode at an efficiency setting during mild outdoor temperature conditions.

29. In a heating, ventilating and air conditioning system including an indoor unit comprising a variable speed electric motor driven fan for circulating air to and from an enclosed space, said indoor unit including at least one heat exchanger for providing one of a heating and cooling effect to said air circulating to said indoor space and a controller including user actuatable switch actuators and a microcontroller operable to provide a signal to a motor control unit for said electric motor to control motor speed and air circulating rate to said indoor space, the method characterized by:
providing a selected pulse width modulated electrical signal to said motor control unit to provide predetermined motor speed corresponding to said pulse width modulated signal to modify the air flowrate to a predetermined percentage of full air flowrate available from said fan; and
providing said signal to said motor control unit to provide a predetermined air flowrate if one of heating or cooling effect is terminated during one of a pre-run delay period or a short run delay period, said pre-run delay period commencing with a call for one of heating or cooling effect and said short run delay period commencing with termination of said pre-run delay period.

30. In a heating, ventilating and air conditioning system including an indoor unit comprising a variable speed electric motor driven fan for circulating air to and from an enclosed space, said indoor unit including at least one heat exchanger for providing one of a heating and cooling effect to said air circulating to said indoor space and a controller including switch actuators and a microcontroller operable to provide a signal to a motor control unit for said electric motor to control motor speed and air circulation rate to said indoor space, the method characterized by:

provided a selected electrical signal to said motor control unit to provide a predetermined motor speed corresponding to said selected signal to modify the air flowrate to a predetermined percentage of full air flowrate available from said fan during one of a pre-run period after a call for one of heating and cooling effect from said system, a short run period following said pre-run period, and a system shutdown phase commencing with satisfaction of a call for one of heating and cooling effect by said system; and providing said signal to said motor control unit to provide a predetermined air flowrate if one of heating or cooling effect is terminated during one of said pre-run delay period, and said short run delay period, said pre-run delay period commencing with a call for one of heating or cooling effect and said short run delay period commencing with termination of said pre-run delay period.

31. In a heating, ventilating and air conditioning system including an indoor unit comprising a variable speed electric motor driven fan for circulating air to and from an enclosed space, said indoor unit including at least one heat exchanger for providing one of a heating and cooling effect to said air circulating to said indoor space and a controller including switch actuators and a microcontroller operable to provide a signal to a motor control unit for said electric motor to control motor speed and air circulation rate to said indoor space, the method characterized by:

providing a selected electrical signal to said motor control unit to provide a predetermined motor speed corresponding to said selected signal to modify the air flowrate to a predetermined percentage of full air flowrate available from said fan during one of a pre-run period after a call for one of heating and cooling effect from said system, a short run period following said pre-run period, and a system shutdown phase commencing with satisfaction of a call for one of heating and cooling effect by said system;

causing said microcontroller to provide a signal to said control unit for providing a predetermined air flowrate dependent on single stage operation or multistage operation of said system; and causing said controller to provide a signal to said control unit to provide maximum air flowrate through said system when said system is operating at a highest stage of compression unless said system is operating in conjunction with a humidity sensor or said system is a heat pump operating in the heat pump heating mode or said system is operating in the cooling mode at an efficiency setting during mild outdoor temperature conditions;

wherein said system comprises a multistage compressor for circulating a heat exchange fluid and said method includes the step of causing said microcontroller to provide a signal to said control unit to provide a reduced air flowrate when said system is operating at a first or low stage of compression.

* * * * *

UNITED STATES PATENT AND TRADEMARK OFFICE
CERTIFICATE OF CORRECTION

PATENT NO. : 7,640,761 B2 Page 1 of 1
APPLICATION NO. : 11/265049
DATED : January 5, 2010
INVENTOR(S) : Garrett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Sixteenth Day of November, 2010

David J. Kappos
*Director of the United States Patent and Trademark Office*